US012623305B2

(12) United States Patent
Kohl et al.

(10) Patent No.: US 12,623,305 B2
(45) Date of Patent: May 12, 2026

(54) METHOD FOR MACHINING A METAL-CERAMIC SUBSTRATE, SYSTEM FOR SUCH A METHOD AND METAL-CERAMIC SUBSTRATES PRODUCED USING SUCH A METHOD

(71) Applicant: Rogers Germany GmbH, Eschenbach (DE)

(72) Inventors: Thomas Kohl, Auerbach (DE); Bernhard Rettinger, Windischeschenbach (DE)

(73) Assignee: ROGERS GERMANY GMBH, Eschenbach (DE)

( * ) Notice: Subject to any disclaimer, the term of this patent is extended or adjusted under 35 U.S.C. 154(b) by 810 days.

(21) Appl. No.: 17/772,906

(22) PCT Filed: Dec. 3, 2020

(86) PCT No.: PCT/EP2020/084469
§ 371 (c)(1),
(2) Date: Apr. 28, 2022

(87) PCT Pub. No.: WO2021/115921
PCT Pub. Date: Jun. 17, 2021

(65) Prior Publication Data
US 2024/0157482 A1 May 16, 2024

(30) Foreign Application Priority Data
Dec. 11, 2019 (DE) ..................... 10 2019 134 004.7

(51) Int. Cl.
*B23K 26/382* (2014.01)
*B23K 26/06* (2014.01)
(Continued)

(52) U.S. Cl.
CPC ........ *B23K 26/382* (2015.10); *B23K 26/0648* (2013.01); *B23K 26/0624* (2015.10);
(Continued)

(58) Field of Classification Search
CPC .............. B23K 26/382; B23K 26/0648; B23K 26/0624; B23K 26/082; B23K 26/384; B23K 2103/18; B23K 2103/52
See application file for complete search history.

(56) References Cited

U.S. PATENT DOCUMENTS

2010/0285331 A1* 11/2010 Kitahara ................. H01L 23/15
428/650
2015/0129565 A1* 5/2015 Gauch .................... B23K 26/40
219/121.73
(Continued)

FOREIGN PATENT DOCUMENTS

CN 109128533 A * 1/2019 ............. B23K 26/14
DE 2319854 C2 12/1983
(Continued)

OTHER PUBLICATIONS

CN109128533A—translate (Year: 2025).*
(Continued)

*Primary Examiner* — Elizabeth M Kerr
*Assistant Examiner* — Keith Brian Assante
(74) *Attorney, Agent, or Firm* — CANTOR COLBURN LLP

(57) ABSTRACT
A method of processing a metal-ceramic substrate (1), including
providing a metal-ceramic substrate (1), wherein the metal-ceramic substrate (1) comprises at least one metal layer (21) and one ceramic element (11), which extend along a main extension plane (HSE) and are arranged one above the other along a stacking direction (S) extending perpendicularly to the main extension plane (HSE), and
(Continued)

forming a recess (15), in particular a through recess (15), in the metal-ceramic substrate (1) by processing by means of laser light (10), in particular of an ultrashort pulse (UKP) laser.

14 Claims, 4 Drawing Sheets

(51) Int. Cl.

| | | |
|---|---|---|
| *B23K 26/0622* | (2014.01) | |
| *B23K 26/064* | (2014.01) | |
| *B23K 26/082* | (2014.01) | |
| *B23K 26/384* | (2014.01) | |
| *B23K 103/00* | (2006.01) | |
| *B23K 103/18* | (2006.01) | |

(52) U.S. Cl.
      CPC .......... *B23K 26/082* (2015.10); *B23K 26/384* (2015.10); *B23K 2103/18* (2018.08); *B23K 2103/52* (2018.08)

(56)                    References Cited

U.S. PATENT DOCUMENTS

| | | | | |
|---|---|---|---|---|
| 2015/0346483 A1* | 12/2015 | Ehrmann | ........... | B23K 26/0648 219/121.85 |
| 2016/0031037 A1* | 2/2016 | Chang | ................... | B23K 26/38 219/121.75 |
| 2016/0035474 A1* | 2/2016 | Azuma | .............. | B23K 26/0622 29/605 |

| | | | | |
|---|---|---|---|---|
| 2016/0207143 A1 | 7/2016 | Chen et al. | | |
| 2020/0098696 A1* | 3/2020 | Rogg | .................... | H01L 23/544 |
| 2020/0398372 A1* | 12/2020 | Rogg | .................... | C04B 37/021 |
| 2021/0162540 A1* | 6/2021 | Houbertz | ........... | G03F 7/70416 |

FOREIGN PATENT DOCUMENTS

| | | |
|---|---|---|
| DE | 69023382 T2 | 6/1996 |
| DE | 10133341 A1 | 1/2003 |
| DE | 10355983 A1 | 6/2005 |
| DE | 202009014893 U1 | 5/2011 |
| DE | 102010016862 A1 | 11/2011 |
| DE | 102012217766 A1 | 4/2014 |
| DE | 102013102540 A1 | 8/2014 |
| EP | 0476772 A2 | 3/1992 |
| EP | 0826457 A1 | 3/1998 |
| EP | 1977850 A1 | 10/2008 |
| EP | 3417982 A1 | 12/2018 |
| JP | H0575253 A | 3/1993 |
| JP | H1045482 A | 2/1998 |
| JP | 2002261439 A | 9/2002 |
| JP | 2004306137 A | 11/2004 |
| KR | 20090083301 A | 8/2009 |
| KR | 20130076444 A | 7/2013 |
| KR | 20150102872 A | 9/2015 |
| WO | 2017108950 A1 | 6/2017 |
| WO | 2018234457 A1 | 12/2018 |

OTHER PUBLICATIONS

International Preliminary Report on Patentability for International Application No. PCT/EP2020/084469, Filing Date: Dec. 3, 2020; Date of Mailing: Jun. 16, 2022, 6 pages.

* cited by examiner

METHOD FOR MACHINING A METAL-CERAMIC SUBSTRATE, SYSTEM FOR SUCH A METHOD AND METAL-CERAMIC SUBSTRATES PRODUCED USING SUCH A METHOD

CROSS-REFERENCE TO RELATED APPLICATIONS

This application is a National Stage filing of PCT/EP2020/084469, filed Dec. 3, 2020, which claims priority to DE 10 2019 134 004.7, filed Dec. 11, 2019, both of which are incorporated by reference in their entirety herein.

BACKGROUND

The present invention relates to a method of processing metal-ceramic substrates, an apparatus for such a method, and metal-ceramic substrates produced by such a method.

Electronic modules are well known from the prior art, for example as power electronic modules. Such electronic modules typically use switchable or controllable electronic components that are interconnected on a common metal-ceramic substrate via conductor tracks. Essential components of the metal-ceramic substrate are an insulation layer, which in the case of the metal-ceramic substrate is made of a material comprising a ceramic, and a metallization layer, which is preferably structured and formed on one component side of the metal-ceramic substrate to form conductor tracks.

Typically, a metal-ceramic substrate is realized as a large card which is separated into smaller metal-ceramic substrates after or before structuring. Such large cards are processed by laser light to produce predetermined breaking lines and/or separation points. The respective metal-ceramic substrates can then be provided separately from the large card, e.g., by breaking them out. The use of ultrashort pulse lasers has proven advantageous here, as described for example in WO 2017/108 950 A1.

From US 2016 0 207 143 A1 a method for processing a workpiece with laser light is known, wherein the workpiece is placed on a stage. EP 0 826 457 A1 also concerns the production of drill holes by means of laser light.

SUMMARY

Based on this prior art, the present invention has the object to improve the processing of metal-ceramic substrates.

This object is achieved by a method for processing a metal-ceramic substrate as described herein, by an apparatus suitable therefor, and by a metal-ceramic substrate produced by such a method. Further embodiments are to be taken from the subclaims and the description.

In accordance with a first aspect of the present invention, there is provided a method of processing a metal-ceramic substrate, comprising providing a metal-ceramic substrate, wherein the metal-ceramic substrate comprises at least one metal layer and one ceramic element, which in particular both extend along a main extension plane and are arranged one above the other along a stacking direction extending perpendicularly to the main extension plane, and forming a recess, in particular a through recess, in the metal-ceramic substrate by processing by means of laser light, in particular of an ultrashort pulse (UKP) laser.

BRIEF DESCRIPTION OF THE FIGURES

Further advantages and features result from the following description of embodiments with reference to the attached figures. Individual features of the individual embodiment can thereby be combined with each other within the scope of the invention, which show, in.

DETAILED DESCRIPTION

Figure 1:
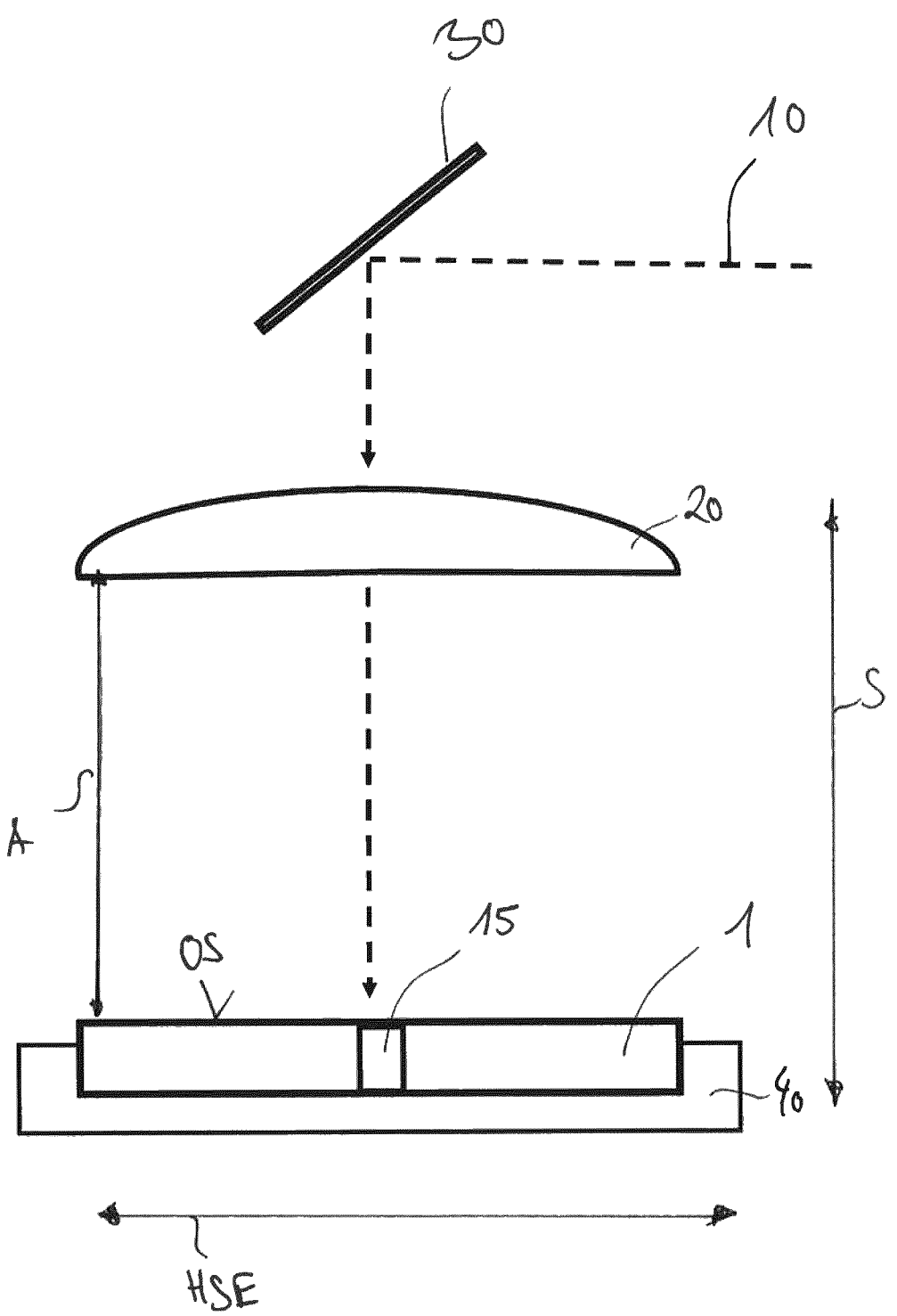
FIG. 1: a schematic representation of a method for processing a metal-ceramic substrate according to a first exemplary embodiment of the present invention.

In contrast to the methods known from the prior art, laser light is to be used to form the recess, in particular a UKP laser. In this context, the skilled person understands a recess to be an area which is surrounded or enclosed by the metal-ceramic substrate, preferably in one plane to an extent of more than 50%, preferably more than 75%, and particularly preferably completely, and which is free of metal and/or ceramic. For example, the recess is surrounded by a curved or polygonal contour produced by means of a laser light. In this context, it is conceivable that the recess, for example after an appropriate film and/or solder paste and/or other conductive material has been introduced, is used as a through-hole plating and/or preferably as an area through which a fastening element, such as a screw and/or bolt, engages in order to fasten the metal-ceramic substrate to a housing and/or another component. Fabrication using laser light has been shown to be advantageous, particularly in terms of quality and fabrication time in forming the recesses. For example, using ultra-short pulse laser light allows the number of post-processing steps for the metal-ceramic substrate to be reduced. In addition, it is advantageously possible, for example via a corresponding mirror element, to guide the laser light in a scan-like manner over the upper surface of the metal-ceramic substrate in order to realize the desired shape and contour of the recess.

It is particularly preferred that the recess extends through the entire metal-ceramic substrate, i.e., from an upper surface of the metal-ceramic substrate to a backside of the metal-ceramic substrate. The metal-ceramic substrate is preferably held or fixed by a support or holding element during processing by means of the laser light.

Furthermore, the metal-ceramic substrate comprises at least one metal layer which is bonded to an upper surface of a ceramic layer, the metal layer and the ceramic layer extending along a main extension plane and being arranged one above the other along a stacking direction running perpendicular to the main extension plane. Conceivable materials for the at least one metal layer are copper, aluminum, molybdenum and/or alloys thereof, as well as laminates such as CuW, CuMo, CuAl, AlCu and/or CuCu, in particular a copper sandwich structure with a first copper layer and a second copper layer, wherein a grain size in the first copper layer differs from a second copper layer. It is further preferred that the at least one metal layer is surface modified. A conceivable surface modification is, for example, sealing with a noble metal, in particular silver and/or gold, or ENIG ("electroless nickel immersion gold") or edge sealing on the first or second metallization layer to suppress crack formation or expansion.

For example, the ceramic element is at least one ceramic layer or composite comprising at least one ceramic layer. Preferably, at least one of the ceramic layers comprises $Al_2O_3$, $Si_3N_4$, AlN, an HPSX ceramic (i.e. a ceramic with an $Al_2O_3$ matrix comprising an x percentage of $ZrO_2$, for example $Al_2O_3$ with 9% $ZrO_2$=HPS9 or $Al_2O_3$ with 25% $ZrO_2$=HPS25), SiC, BeO, MgO, high-density MgO (>90% of the theoretical density), TSZ (tetragonally stabilized zirconia) or ZTA as the material for the ceramic. It is also conceivable that the insulation layer is designed as a composite or hybrid ceramic, in which several ceramic layers, which each differ in terms of their material composition, are arranged on top of one another and joined together to form an insulation layer in order to combine various desired properties. Preferably, a ceramic that is as thermally conductive as possible is used for a thermal resistance to be as low as possible.

A ceramic element or ceramic layer is preferably understood to mean no glass or a material consisting of more than 50% glass. Thus, the ceramic element is preferably a glass-free ceramic element. Preferably, it is provided that the recess is created by repeatedly traversing the metal-ceramic substrate along the same contour.

Preferably, the metal layer is bonded to the insulating layer by means of an AMB process and/or a DCB process.

The skilled person understands a "DCB process" (direct copper bond technology) or a "DAB process" (direct aluminum bond technology) to be such a process which serves, for example, to bond metal layers or sheets (e.g., copper sheets or foils or aluminum sheets or foils) to one another and/or to ceramics or ceramic layers, using metal or copper sheets or metal or copper foils which have a layer or coating (fusion layer) on their surface sides. In this process described, for example, in U.S. Pat. No. 3,744,120 A or in DE 23 19 854 C2, this layer or coating (fusion layer) forms a eutectic with a melting temperature below the melting temperature of the metal (e.g., copper), so that by placing the foil on the ceramic and by heating all the layers, they can be bonded to one another by melting the metal or copper essentially only in the region of the fusion layer or oxide layer.

In Particular, the DCB Process then has, for Example, the Following Process Steps:

Oxidizing a copper foil in such a way that a uniform copper oxide layer is formed;

Placing the copper foil on the ceramic layer;

Heating the composite to a process temperature between about 1025 to 1083° C., e.g., to about 1071° C.;

Cooling to room temperature.

By an active soldering process, e.g. for bonding metal layers or metal foils, in particular also copper layers or copper foils with ceramic material, is meant a process which is specifically also used for producing metal-ceramic substrates, a bond is produced at a temperature between approx. 650-1000° C. between a metal foil, for example copper foil, and a ceramic substrate, for example aluminum nitride ceramic, using a brazing alloy which, in addition to a main component such as copper, silver and/or gold, also contains an active metal. This active metal, which is for example at least one element of the group Hf, Ti, Zr, Nb, Ce, establishes a connection between the brazing alloy and the ceramic by chemical reaction, while the connection between the brazing alloy and the metal is a metallic brazing connection. Alternatively, a thick film process is also conceivable for bonding.

According to a preferred embodiment, it is provided that the laser light is directed onto the metal-ceramic substrate via at least one pivotable mirror element or reflective element and, in particular, is moved over the metal-ceramic substrate by means of the at least one pivotable mirror element or reflective element. By means of a corresponding scanning device, it is possible, for example, to move the laser beam or the laser light as precisely as possible in position over the planned course of the future recess, i.e., the processing area. In this context, it is particularly envisaged that the at least one mirror element is adapted to the pulse duration and/or wavelength of the laser light used in order to reduce losses during reflection at the at least one mirror element. Furthermore, it is conceivable that the at least one mirror element is a concave mirror and/or a dielectric mirror in order to focus the laser beam at least partially already, preferably after and/or before passing through an additional lens. By focusing, in particular by means of a lens, the intensity of the incident laser pulses can be increased in an advantageous manner. Furthermore, it is particularly preferred that the at least one mirror element can be pivoted about at least two axes. This makes it possible to ensure that, by means of the respective orientation of the mirror element, every point on the upper surface of the metal-ceramic substrate can be detected by the light beam. Preferably, exactly one mirror element is involved.

Preferably, the UKP laser is a laser source which provides light pulses with a pulse duration of 0.1 to 800 ps, preferably 1 to 500 ps, more preferably 10 to 50 ps. It has been found to be particularly advantageous to use such pulses, in particular with the above-mentioned processing speeds, to produce recesses and/or predetermined breaking lines or predetermined breaking points which have a particularly favorable ratio between melted ceramic and crack formation within the predetermined breaking lines, whereby, for example, in the case of the predetermined breaking lines, particularly reliable or successful breaking along the predetermined breaking lines can also be ensured without damage occurring to the singled metal-ceramic substrate during breaking. Preferably, predetermined breaking lines to the recess are realized, for example with the same laser system.

Preferably, a cross-section of the recess extending parallel to the main extension plane is larger than a cross-section of the laser light measured along the same plane. Preferably, the cross-section of the recess has a first diameter and the cross-section of the laser light has a second diameter, wherein a ratio of the second diameter to the first diameter assumes a value below 0.2, preferably smaller than 0.1 and more preferably smaller than 0.05. In this way, for example by moving the laser light along the upper surface of the metal-ceramic substrate, it is possible to define a cut-out contour which determines the shape of the subsequent cross-section of the recess. In particular, such processing serves to form a recess through which, in the later manufactured metal-ceramic substrate, a fastening device or fixture passes for fastening. Such recesses with a correspondingly large cross-section do not generally serve to form a through-plating, but are preferably provided for simply fixing the metal-ceramic substrate to other components.

It is particularly preferred that the laser light is directed to a processing region of the metal-ceramic substrate via a lens, wherein a distance between the lens and an upper surface of the metal-ceramic substrate is changed during processing. In particular, the distance between the lens and the top surface of the metal-ceramic substrate refers to an area outside the area by which the recess is formed, i.e., outside the processing area. By redrawing the distance between the lens and the upper surface of the metal-ceramic substrate, it is possible to take into account in an advantageous manner the fact that, in the course of the processing, an ablation takes place on the metal-ceramic substrate, as a result of which, without a corresponding reduction in the distance between the lens and the upper surface of the metal-ceramic substrate, the focus of the lens would fall into an area in which an ablation of the metal-ceramic substrate material has already taken place. By a corresponding coordinated change of the distance between the lens and the upper surface of the metal-ceramic substrate, it can be advantageously ensured that the focus of the laser light is located in the area of the metal-ceramic substrate material to be ablated or directly above and/or below a boundary layer that is to be ablated. For this purpose, a distance between the lens and the metal-ceramic substrate is preferably changed along the stacking direction. In particular, the (total) change in the distance between the lens and the metal-ceramic substrate essentially corresponds to a thickness of the metal-ceramic substrate dimensioned in the stacking direction.

Furthermore, it is conceivable that an inclination of the laser light changes during processing. This allows the contours of the inside of the recess to be shaped as desired, for example. It is also conceivable that the recess is formed in such a way that a stepped contour is realized on the inside of the recess. This makes it possible, for example, to provide a free area on the upper surface of the metal-ceramic substrate in which a head of a fastener can be countersunk. Here it can be advantageous, for example, to provide a different angle of inclination of the inside of the recess in a first section during processing in order to adapt this first section to the shape of the head of the fastener.

It is preferably provided that the laser light is incident perpendicularly on the metal-ceramic substrate at least at times, preferably during the entire processing. This makes it possible to create a cylindrical recess with a substantially constant cross-section as viewed in the stacking direction. For example, an inclination of the inside of the recess with respect to a direction perpendicular to the main extension plane is less than 10%, preferably less than 5% and more preferably less than 2.5%.

Preferably, the metal-ceramic substrate is processed exclusively in the metal-free area of the metal-ceramic substrate. For example, it is intended that the recess is created by repeatedly traversing the metal-ceramic substrate along the same contour.

For example, it is also conceivable that a further laser light is provided, wherein by means of the laser light and the further laser light the recess is formed. This can significantly accelerate the production of the recess. It is conceivable that the laser light and the further laser light process the metal-ceramic substrate at the same time at different points of a common contour, wherein the laser light and the further laser light both follow the common contour to form the recess.

Furthermore, it is preferred that a focal length of the lens greater than 300 mm is used. With a comparatively large focal length, in particular greater than 300 mm, preferably greater than 350 mm and more preferably greater than 430 mm, it is advantageously possible to use the laser light to generate, in addition to the recess, predetermined breaking lines whose inclination relative to a direction running perpendicular to the main extension is comparatively small. This advantageously ensures uniform fracture behavior of the metal-ceramic substrate, in particular over the entire large card. Preferably, the same laser system is used to provide laser light which is used, on the one hand, to produce predetermined fracture lines and, on the other hand, to generate the recess in the metal-ceramic substrate. By changing the laser parameters and/or using filters, the properties for generating the predetermined breaking line on the one hand and the recess on the other hand can preferably be changed.

In particular, it is provided that the distance between the lens and the metal-ceramic substrate never falls below the focal length of the lens by a value greater than a thickness of the metal-ceramic substrate, in particular when the lens and/or the metal-ceramic substrate are moved towards each other. This can ensure that the laser light always remains focused, in particular when the material is ablated layer by layer and the focus of the laser light is traced.

Preferably, it is provided that a change of the distance is made continuously or in discrete steps. In particular, it is conceivable that a recess depth, especially a current recess depth, is measured simultaneously with the processing of the metal-ceramic substrate to create the recess, so that the distance between the lens and the metal-ceramic substrate can be set depending on the current value for the recess depth. For example, the recess depth is measured optically, by means of a camera and/or another laser system. Alternatively or additionally, it is conceivable that the laser light is moved along a closed contour, with a discrete change step in the distance between the lens and the metal-ceramic substrate being made after each traverse or a fixed number of traversals of the closed contour.

Preferably, it is provided that the metal-ceramic substrate comprises at least one backside metallization, wherein in particular the at least one backside metallization and the at least one metallization are arranged on opposite sides of the ceramic element. By forming the recess, which extends to the backside metallization and additionally ablates it, it is advantageously possible to produce recesses whose backside metallizations are burr-free, in particular on the side of the backside metallization facing away from the ceramic element. In this way, the method differs in particular from conventional methods, for example those using $CO_2$ lasers, in that a final post-processing step in which deburring of the recess is performed is omitted. This speeds up the manufacturing process for creating the metal-ceramic substrate in which a recess is provided.

Preferably, the laser light is guided at least in sections along a curved contour to form the recess. In particular, the curved contour corresponds to a direction of movement along which the laser light is guided, so that an at least sectionally circular or round course results for the edge of the recess. Alternatively, polygonal or angular or rectilinear edge contours for the recesses are conceivable, which are realized by a corresponding adjustment of the direction of movement of the laser light, in particular by the alignment of the mirror.

Furthermore, it is preferably provided that a separated component of the metal-ceramic substrate is removed, preferably by means of a vacuum mechanism. For example, a suction device is provided for this purpose, which is preferably integrated into the carrier and is arranged below the processing area or the planned area for the recess. If the laser light follows a corresponding contour that borders the later recess, the area of the metal-ceramic substrate encompassed by the border or later border of the recess is cut out. In order to enable or facilitate the separation of the cut-out region of the metal-ceramic substrate from the remaining metal-ceramic substrate with the manufactured recess, it is advantageously possible to fix the remainder or separated part of the metal-ceramic substrate to the carrier by means of the vacuum mechanism, while the metal-ceramic substrate is released from the carrier.

A further aspect of the present invention is an apparatus for carrying out the process according to the invention. All features and advantages described for the method apply analogously to the apparatus and vice versa.

A further aspect of the present invention is a metal-ceramic substrate manufactured by a method according to the invention. All the features and advantages described for the method can be transferred analogously to the metal-ceramic substrate and vice versa.

Further advantages and features result from the following description of preferred embodiments of the subject-matter according to the invention with reference to the attached figures. Individual features of the individual embodiment can thereby be combined with each other within the scope of the invention.

FIG. 1 schematically shows a method for processing a metal-ceramic substrate 1 according to a first preferred embodiment of the present invention. Such a metal-ceramic substrate 1 preferably serves in each case as a carrier element of electronic or electrical components which can be connected to the metal-ceramic substrate 1. Essential components of such a metal-ceramic substrate 1 are a ceramic element 11 extending along a main extension plane HSE and at least one metal layer 21 bonded to the ceramic element 11. The ceramic element 11 is made of at least one material comprising a ceramic. In this case, the at least one metal layer 21 and the ceramic element 11 are arranged one above the other along a stacking direction S extending perpendicularly to the main extension plane HSE and, in a manufactured state, are materially bonded to one another at least in regions via a bonding surface. The ceramic element 11 comprises at least one ceramic layer and can also be formed, for example, from a plurality of ceramic layers between which an intermediate metallization is formed or which form a hybrid ceramic. Preferably, the at least one metal layer 21 is then patterned to form conductive paths or connection points for the electrical components. For example, this structuring is etched into the at least one metal layer 21. In advance, however, a permanent bond, in particular a material bond, must be formed between the at least one metal layer 21 and the ceramic element 11.

In order to permanently bond the at least one metal layer 21 to the ceramic element 11, a system for manufacturing the metal-ceramic substrate 1, in particular in a DCB or DAB bonding process, comprises a furnace in which a stacked assembly of the ceramic element 11 and the at least one metal layer 21 is heated to achieve the bond. For example, the at least one metal layer 21 is a metal layer made of copper, wherein the at least one metal layer 21 and the ceramic element 11 are bonded together using a DCB (direct copper bonding) bonding method. Alternatively, the at least one metal layer 21 can be bonded to the ceramic element 11 by an active soldering method or a thick film method.

After bonding, in particular by means of a DCB process, an act soldering process and/or a thick film process, the metal-ceramic substrate 1 is provided as a large card. Such large cards are to be singulated in the subsequent process in order to provide singulated metal-ceramic substrates 1 in each case. Preferably, for such a separation, it is intended to process the large card by means of laser light 10, in particular by means of ultrashort pulse laser light. Thereby, it is possible to immediately realize a separation by means of the laser light 10 and/or to form a predetermined breaking line along which the large card is broken in the subsequent process, forming the separated metal-ceramic substrates 1. By an ultrashort pulse laser, the person skilled in the art understands in particular such laser sources which emit laser pulses whose pulse length is less than one nanosecond. Preferably, the pulse duration is between 0.1 and 100 ps. Furthermore, it is conceivable that the pulse duration is in the femtosecond range, i.e., the pulse length is 0.1 to 100 fs. In the exemplary embodiment shown in FIG. 1, the metal-ceramic substrate 1 is arranged in a carrier 40.

In particular, it is provided that the laser light 10, in particular laser light 10 of the UKP laser, is used to produce a recess 15, in particular a through recess 15, in the metal-ceramic substrate 1. The recess 15 is, for example, a type of through-hole which is used, for example, for through-plating and/or a recess 15 which is provided as a through-hole for providing a connection or fastening area with which the metal-ceramic substrate 1 is bonded as a power module to a housing or another component. In this context, it is conceivable that the recess 15 is created temporally before and/or after the production of the predetermined breaking lines. Preferably, the same laser light 10, i.e., the light from the same light source, is used to produce the recess 15 and the predetermined breaking line. It is conceivable that the intensities, pulse durations and/or powers of the pulses for producing predetermined breaking lines differ from those for producing the recess 15.

Furthermore, it is expediently provided that the metal-ceramic substrate 1 is arranged in a stationary manner by means of the carrier 40. In order to generate a predetermined breaking line and/or a recess 15 in the metal-ceramic substrate 1, which in particular has a specific course as seen over the metal-ceramic substrate 1, it is provided that laser light 10 or a laser beam is moved over the metal-ceramic substrate 1. In other words, instead of moving the metal-ceramic substrate 1 relative to the laser light 10 or the alignment thereof, it is envisaged that the alignment of the laser light 10 or laser beam is carried out in such a way that the laser light 10 traversed over the metal-ceramic substrate 1 generates a predetermined breaking line and/or recess 15 at the respective impact points. It is conceivable that the predetermined breaking line and/or recess 15 is continuous and/or interrupted, i.e., the predetermined breaking line is present as a perforation.

To align the laser light 10, it is provided in particular that the laser light 10 is directed onto a mirror element 30. The laser beam 10 is reflected at the mirror element 30 and subsequently impinges on the metal-ceramic substrate 1. In this context, it is particularly provided that the mirror element 30 is pivotably mounted, in particular pivotably mounted about at least two axes, in order to align the laser light 10 with a specific treatment area or specific areas on the metal-ceramic substrate 1. Furthermore, it is preferably provided that a lens 20 is arranged between the mirror element 30 and the metal-ceramic substrate 1. In particular, the lens 20 extends along a plane substantially perpendicular to the incident direction of the laser light substantially over a length corresponding to the length and/or width of the metal-ceramic substrate 1, in particular as a large card. In other words, the laser light 10 traveling over the metal-ceramic substrate 1 always passes through the same lens regardless of the processing area.

It has proved particularly advantageous to use a lens 20 whose focal length is greater than 300 mm, preferably greater than 350 mm and more preferably greater than 420 mm. Arranging the lens 20 at a distance A from metal-ceramic substrate 1 which corresponds essentially to the focal length of the lens 20 then makes it possible to create predetermined breaking points or predetermined breaking lines or the recess 15 which are inclined comparatively slightly with respect to a perpendicular to the main extension plane HSE of the metal-ceramic substrate 1. Otherwise, an angle of inclination of the essentially V-shaped or notch-shaped predetermined breaking lines or of the recess 15 would have to be expected. This applies in particular to predetermined breaking lines or recesses 15 which are formed at the edge of the metal-ceramic substrate 1. Such a slanted position is thereby caused in particular by the fact that the laser light 10 or the laser beams cannot impinge perpendicularly on the metal-ceramic substrate 1 evenly over the entire extent of the metal-ceramic substrate 1. However, by using the focal length greater than 300 mm, this skew, in particular in the edge regions of the metal-ceramic substrate 1 is reduced in such a way that an angle of inclination measured or referred to the perpendicular direction of the metal-ceramic substrate 1 is smaller than 12°, more preferably smaller than 10°. In particular, it should be established that a deviation of the inclination angle compared to the orientation of the predetermined breaking line in the center of the metal-ceramic substrate 1 does not become larger than 12°. Thus, it is advantageously possible to create whose fracture behavior is substantially homogeneously distributed over the entire metal-ceramic substrate 1.

Furthermore, it is preferably provided that a distance A between the lens 20 and an upper surface OS of the metal-ceramic substrate 1 is changed, in particular reduced, during the processing for manufacturing the recess 15. Thus, it is advantageously possible to trace the focus of the laser light 10 caused by the lens 20, according to the depth of the recess 15 already made during the processing of the metal-ceramic substrate 1. In other words, by changing the distance A, it is possible to take into account the successive ablation in the metal-ceramic substrate 1 to form the recess 15 such that the focus of the laser light 10 is shifted further into the metal-ceramic substrate 1 and/or to the backside of the metal-ceramic substrate as the ablation of the at least one metal layer 21 and/or the ceramic element 11 increases. In this way, the laser power is kept as large as possible in the area of the material that is currently being ablated, so that a decrease in laser efficiency with respect to the ablation of the material is not to be expected with increasing ablation depth. This advantageously leads to an accelerated ablation process, which speeds up the formation of the recess 15. In particular, it is provided that by changing the distance A, a shift of the focus along the stacking direction S takes place. Therein, the change of the distance A between the lens 20 and the upper surface OS of the metal-ceramic substrate 1 is preferably performed continuously and/or in successive or discrete steps. To change the distance A, the lens 20 is preferably displaced along a direction perpendicular to the main extension plane HSE. Alternatively and/or supplementarily, it is conceivable that the carrier 40 and thus the metal-ceramic substrate 1 is displaced along a direction running parallel to the stacking direction S, so as to reduce the distance A between the lens 20 and the upper surface OS of the metal-ceramic substrate 1. In particular, it is provided that the focal length of the lens 20 is constant.

Figure 2:
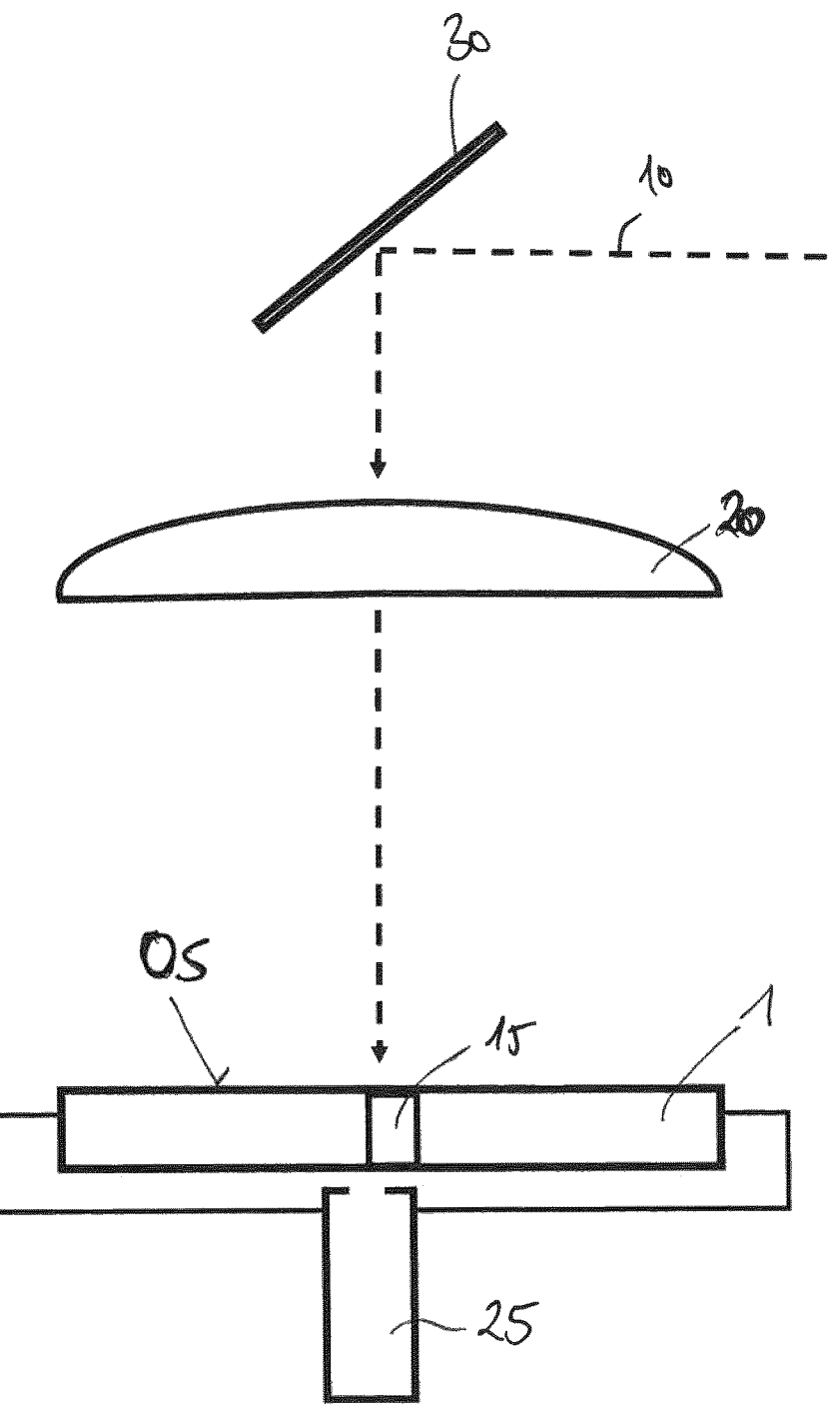
FIG. 2: a schematic representation of a method for processing a metal-ceramic substrate according to a second exemplary embodiment of the present invention, FIG. 3 a schematic representation of a method for processing a metal-ceramic substrate according to a third exemplary embodiment of the present invention, and FIG. 4 a schematic representation of a method for processing a metal-ceramic substrate according to a fourth exemplary embodiment of the present invention.

FIG. 2 schematically illustrates a method for producing a metal-ceramic substrate 1 according to a second exemplary embodiment of the present invention. The method shown in FIG. 2 differs from the exemplary embodiment shown in FIG. 1 in that a suction device 25 is additionally provided. This suction device 25 is integrated, for example, in the carrier 40 and arranged below the processing area in which the planned recess 15 is realized. By means of the suction device 25, it is advantageously possible to cause a negative pressure that sucks off ablated particles of the metal-ceramic substrate 1 and/or ensures that a partial area of the metal-ceramic substrate 1 separated during the processing of the metal-ceramic substrate 1 and/or during the formation of the recess 15 can be separated from the metal-ceramic substrate 1 with the recess 15. In particular, this relates to processing for forming recesses 15 whose cross-section is much larger than a cross-section of the laser light 10 in a direction parallel to the main extension plane HSE. In such a scenario where the diameter and/or a cross-section of the laser light 10 is smaller than a cross-section of the recess 15, the laser light 10 follows a movement during processing along a processing direction B that defines, for example, the contour of the recess 15 in a plane parallel to the main extension plane HSE. The partial area of the metal-ceramic substrate 1 enclosed by the contour is then fixed to the carrier 40 as a residual piece by the vacuum mechanism, while the remaining, finished part of the metal-ceramic substrate 1 is released from the carrier 40.

Figure 3:
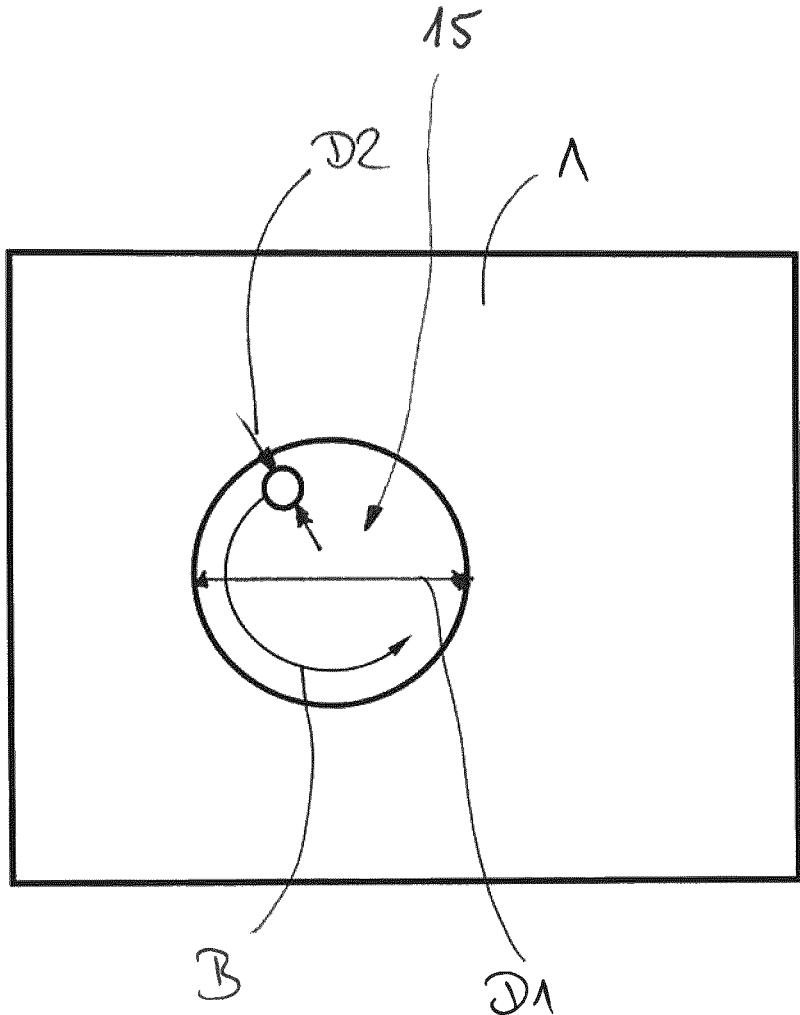

FIG. 3 schematically illustrates a method for forming a recess 15 in a metal-ceramic substrate 1 according to a third exemplary embodiment of the present invention. In particular, FIG. 3 shows a top view of the metal-ceramic substrate 1 and the movement of the laser light 10 along a movement direction B, forming a circular or arcuate contour. It is also conceivable that the laser light 10 follows a spiral contour, in particular with decreasing and/or increasing radius. In particular, it is intended to realize a circular contour for the recess 15 by means of a correspondingly selected processing direction B. Therein, it is provided that the recess 15 has a first diameter D1 and the laser light 10 has a second diameter D2 in a plane running parallel to the main extension plane HSE. In this case, the ratio of the second diameter D2 to the first diameter D1 is less than 0.2, preferably less than 0.1, and more preferably less than 0.05. As an alternative to a circular movement direction B, polygonal movement directions B and/or, at least in sections, linear movement directions B are also conceivable.

Figure 4:
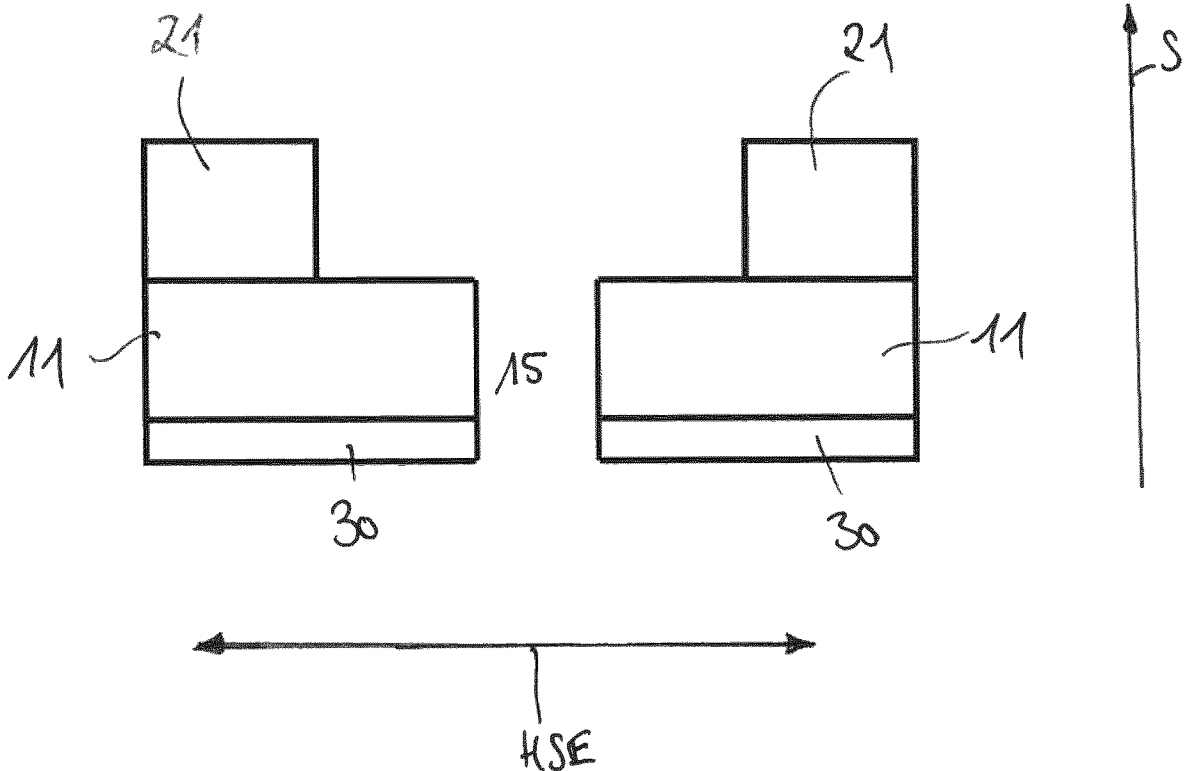

FIG. 4 schematically illustrates a method for processing a metal-ceramic substrate 1 according to a fourth preferred embodiment. In particular, FIG. 4 shows a sectional view through the metal-ceramic substrate 1 along a sectional plane perpendicular to the main extension plane HSE. In this context, it is provided in particular that during the processing of the laser light 10, in particular for producing the through-hole or the through recess 15, a backside metallization 30 is also removed by means of the laser light 10, in particular the laser light 10 from ultrashort pulse lasers. By using ultrashort pulse lasers when creating the recess 15, it is advantageously possible to avoid the formation of burrs, which are typically formed, for example, when manufacturing with $CO_2$ lasers. In a corresponding manner, a post-processing step for deburring the burrs formed can thus be avoided. This proves advantageous with respect to the time for fabricating the metal-ceramic substrate 10 with the recess 15. In particular, it is provided that the recess 15 is provided for receiving a fastening element, such as for receiving a bolt and/or a screw, which extends through the recess 15 for fixing the metal-ceramic substrate 1, for example, to a housing or another component.

REFERENCE NUMERALS 1 metal-ceramic substrate
10 laser light 11 ceramic element
15 recess
20 lens
21 metal layer
25 suction device
30 backside metallization
OS upper surface
HSE main extension plane
S stacking direction
B processing direction
D1 first diameter
D2 second diameter

The invention claimed is:

1. A method of processing and fastening a metal-ceramic substrate (1), comprising providing a metal-ceramic substrate (1), wherein the metal-ceramic substrate (1) comprises at least one metal layer (21) and one ceramic element (11), which extend along a main extension plane (HSE) and are arranged one above the other along a stacking direction (S) extending perpendicularly to the main extension plane (HSE), and forming a recess (15), in the metal-ceramic substrate (1) by processing by means of laser light (10), characterized in that the recess (15) is used as an area through which a fastening element engages in order to fasten the metal-ceramic substrate (1) to a housing or another component and wherein as laser light ultrashort laser pulses are used to avoid the formation of burrs, wherein the laser light is directed onto the metal-ceramic substrate via at least one pivotable mirror element or reflective element and is moved over the metal-ceramic substrate by means of the at least one pivotable mirror element or reflective element, wherein the laser light is guided in section along a curved contour to form the recess.

2. The method according to claim 1, wherein a cross-section of the recess (15) extending parallel to the main extension plane (HSE) is larger than a cross-section of the laser light (10) measured along the same plane.

3. The method according to claim 2, wherein the cross-section of the recess (15) has a first diameter and the cross-section of the laser light has a second diameter, wherein a ratio of the second diameter to the first diameter assumes a value below 0.2.

4. The method according to claim 1, wherein the laser light (10) is directed to a processing region of the metal-ceramic substrate (1) via a lens (20), and wherein a distance (A) between a lens (20) and an upper surface (OS) of the metal-ceramic substrate (1) is changed during processing.

5. The method according to claim 1, wherein a focal length of a lens (L) is greater than 300 mm.

6. The method according to claim 5, wherein a change of the distance (A) is made continuously or in discrete steps.

7. The method according to claim 1, wherein the metal-ceramic substrate (1) comprises at least one backside metallization (30).

8. The method of claim 7, wherein the at least one backside metallization (30) and the at least one metallization (21) are arranged on opposite sides of the ceramic element (11).

9. The method according to claim 1, wherein a separated component of the metal-ceramic substrate (1) is removed.

10. The method according to claim 1, wherein the recess (15) is created by repeatedly traversing the metal-ceramic substrate (1) with the laser light (10) along the same contour.

11. The method according to claim 1, wherein the laser light (10) is incident perpendicularly on the upper surface of the metal-ceramic substrate (1) during processing.

12. The method according to claim 1, wherein a further laser light is provided, wherein by means of the laser light (10) and the further laser light the recess (15) is formed.

13. The method according to claim 1, wherein a ceramic element of the metal-ceramic substrate (1) is glass-free.

14. The method according to claim 1, wherein the recess is a through recess (15).

* * * * *